United States Patent [19]

Yorita

[11] Patent Number: 4,870,696
[45] Date of Patent: Sep. 26, 1989

[54] MOBILE COMMUNICATIONS SYSTEM CAPABLE OF AVOIDING INTERFERENCE WITH CONTROL CHANNEL

[75] Inventor: Takeo Yorita, Tokyo, Japan

[73] Assignee: NEC Corporation, Tokyo, Japan

[21] Appl. No.: 77,466

[22] Filed: Jul. 24, 1987

[30] Foreign Application Priority Data

Jul. 26, 1986 [JP] Japan .................... 61-176358

[51] Int. Cl.⁴ .................... H01J 9/38; H04B 11/16
[52] U.S. Cl. ............................... 455/49; 455/54;
455/33; 455/184; 455/186; 455/187; 379/57;
379/59; 379/60; 379/61
[58] Field of Search ................... 455/49, 53–57,
455/183–187, 76, 77, 343, 127, 33; 379/59, 57,
60, 61

[56] References Cited

U.S. PATENT DOCUMENTS

| | | | |
|---|---|---|---|
| 4,434,461 | 2/1984 | Puhl | 364/200 |
| 4,434,506 | 2/1984 | Fujiwara et al. | 455/53 |
| 4,449,248 | 5/1984 | Leslie et al. | 455/53 X |
| 4,467,140 | 8/1984 | Fathauer et al. | 379/62 |
| 4,513,415 | 4/1985 | Martinez | 455/53 X |
| 4,535,441 | 8/1985 | Schwaertzel et al. | 455/53 X |
| 4,560,840 | 12/1985 | Hansen | 379/389 |
| 4,591,661 | 5/1986 | Benedetto et al. | 379/61 |
| 4,661,972 | 4/1987 | Kai | 379/57 |
| 4,675,863 | 6/1987 | Paneth et al. | 455/33 X |
| 4,698,805 | 10/1987 | Sasuta et al. | 370/97 |
| 4,706,274 | 11/1987 | Baker et al. | 379/61 |
| 4,726,051 | 2/1988 | Schuermann | 455/54 X |
| 4,745,632 | 5/1988 | Duffy | 455/54 X |
| 4,768,218 | 8/1988 | Yorita | 379/61 |
| 4,815,128 | 3/1989 | Malek | 380/9 |
| 4,817,089 | 3/1989 | Paneth et al. | 370/95 |

Primary Examiner—Thomas H. Tarcza
Assistant Examiner—John B. Sotomayor
Attorney, Agent, or Firm—Sughrue, Mion, Zinn, Macpeak, and Seas

[57] ABSTRACT

A mobile communications system having a fixed unit connected to a public telephone network by a subscriber line, and a portable unit connectable to the fixed unit by radio channels which comprise at least one control channel and a plurality of speech channels. The fixed unit includes a transmitter section having a tuner for selectively tuning the transmitter section to one of the radio channels or a first stand-by channel, the frequency of which is not used for communications in the system. The fixed unit also includes a receiving section having a tuner for selectively tuning the first receiver section to one of the radio channels. A controller section control the transmit and receive tuner such that when the fixed unit is in a stand-by condition, the first transmitter and receiver sections are tuned to, respectively, the first stand-by channel and the control channel. The portable unit also has a transmitter section and a receiver section which are coupled to a handset, the transmit section having a tuner for selectively tuning the second transmitter section to one of the radio channels and a second stand-by channel the frequency of which is not used for communications in the system. The receive section has a tuner for selectively tuning the portable receiver section to one of the radio channels. A second controller section is used by the portable unit for controlling the units transmit and receive tuners such that when the portable unit is in a stand-by condition, the portable unit transmitter section and receiver section are tuned to the second stand-by channel and the control channel, respectively.

30 Claims, 5 Drawing Sheets

MOBILE COMMUNICATIONS SYSTEM CAPABLE OF AVOIDING INTERFERENCE WITH CONTROL CHANNEL

BACKGROUND OF THE INVENTION

The present invention relates to a mobile communications system and, more particularly, to a mobile communications system having a control channel for transmitting and receiving control signals.

A mobile communications system such as a cordless telephone system is made up of fixed units connected to a public telephone network, and portable units connectable to the fixed units over radio channels and each including a handset. The radio channels include speech channels adapted for conversations and at least one control channel adapted for the transmission and reception of control signals. The frequencies necessary for the speech and control channels are generated by a synthesizer which is installed in each of the fixed and portable units. That is, a cordless telephone system adopts a multichannel access system which is implemented with synthesizers.

The control channel is used to control the connection of subscriber lines and the portable units, e.g., origination and reception of a call and designation of a speech channel. Those fixed and portable units which are in a stand-by state are turned to the frequency of the control channel. In any of the fixed and portable units held in such a condition, if power sources for a transmitter section and a power amplifier section following the transmitter section are turned ON, an electromagnetic wave will be unwantedly radiated to the control channel, thereby preventing another fixed or portable unit from using the control channel. While such a problem may be solved by shutting off the power supply to the transmitter section and power amplifier section during the stand-by state, this kind of scheme brings about another problem that the synthesizer built in the transmitter section needs a substantial period of time to start its operation and become stable in the event when a conversation is required. In the light of this, it has been customary to, under the stand-by condition, tune the frequency of the synthesizer to that of the control channel and shut off the power supply to the power amplifier section while maintaining the power supply to the transmitter section.

However, such one-sided shut off of the power supply is incapable of fully eliminating the leakage of electromagnetic wave, even if an extra circuit for minimizing the leakage of electromagnetic wave is installed in the power amplifier section as in a prior art system. Also, use of such an extra circuit complicates circuit construction. Especially, the leakage of electromagnetic wave is fatal to a cordless telephone system which has a relatively narrow communication zone (e.g. about several tens of meters), because the fixed and portable units and/or the portable units themselves are frequently used in proximity to each other. In such a case, the leakage of electromagnetic wave to the control channel would adversely affect the operation of the entire system.

SUMMARY OF THE INVENTION

It is, therefore, an object of the present invention to provide a mobile communications system capable of eliminating the leakage of electromagnetic wave to a control channel without resorting to an extra circuit otherwise installed in a power amplifier section.

It is another object of the present invention to provide a mobile communications system capable of eliminating the leakage of electromagnetic wave to a control channel while maintaining an ON condition of a synthesizer of a transmitter section of a unit which is in a stand-by condition.

It is another object of the present invention to provide a mobile communications system which eliminates the leakage of electromagnetic wave to a control channel by tuning a receiver section of a stand-by unit to a control channel and a transmitter section of the same unit to a stand-by channel, which is not used for control and speech channels.

A mobile communications system of the present invention comprises a fixed unit connected to a public telephone network by a subscriber line, and a portable unit connectable to the fixed unit by radio channels which comprise at least one control channel and a plurality of speech channels. The fixed unit comprises a first transmitter section and a first receiver section which are connected to the subscriber line, first transmit tuning means for selectively tuning the first transmitter section to one of the radio channels and a first stand-by channel the frequency of which is not used for communications in the system, first receive tuning means for selectively tuning the first receiver section to one of the radio channels, and a first controller section for controlling the first transmit and receive tuning means such that when the fixed unit is in a stand-by condition, the first transmitter and receiver sections are tuned to, respectively, the first stand-by channel and the control channel. The portable unit comprises a second transmitter section and a second receiver section which are coupled to a handset, second transmit tuning means for selectively tuning the second transmitter section to one of the radio channels and a second stand-by channel the frequency of which is not used for communications in the system, second receive tuning means for selectively tuning the second receiver section to one of the radio channels, and a second controller section for controlling the second transmit and receive tuning means such that when the portable unit is in a stand-by condition, the second transmitter section and receiver section are tuned to the second stand-by channel and the control channel, respectively.

BRIEF DESCRIPTION OF THE DRAWINGS

The above and other objects, features and advantages of the present invention will become more apparent from the following detailed description taken with the accompanying drawings in which.

DETAILED DESCRIPTION OF THE PREFERRED EMBODIMENT

Figure 1:
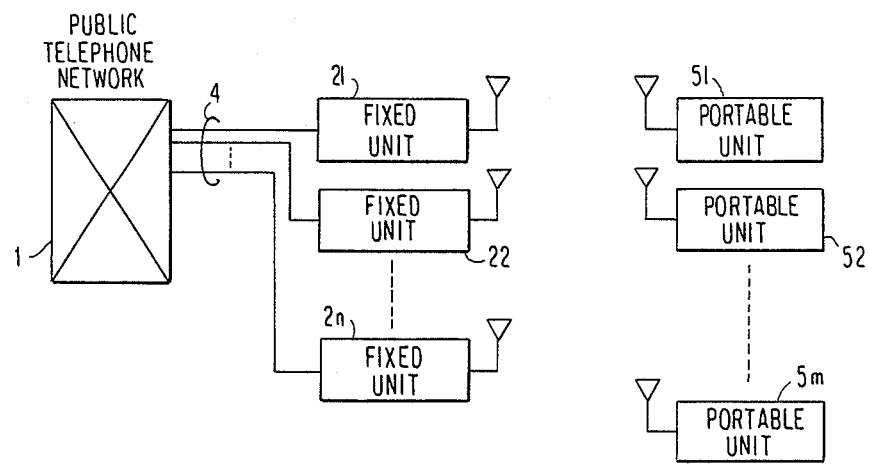
FIG. 1 is a block diagram showing a mobile communications system embodying the present invention.

Referring to FIG. 1 of the drawings, a mobile communications system embodying the present invention is shown and includes fixed units 21 to 2n (n being an integer) which are connected to a public telephone network by subscriber lines 4. The number n of the subscriber lines 4 is the same as the number n of the fixed units. Portable units 51 to 5m are connectable to the fixed units 21 to 2n over radio channels (m is an integer and equal to or greater then n). The radio channels are made up of a single control channel (C-CH) and a plurality of speech channels (S-CH). In this mobile communications system, a transmitter section of any of the fixed units 21 to 2n and portable units 51 to 5m which is in a stand-by condition is tuned to a stand-by channel outside of the frequency band of the control and speech channels, whereby the leakage of electromagnetic wave to the control channel is eliminated. Also, the frequency of the stand-by channel may be situated inside the frequency band of the control and speech channels while it is not used for communications.

Figure 2:
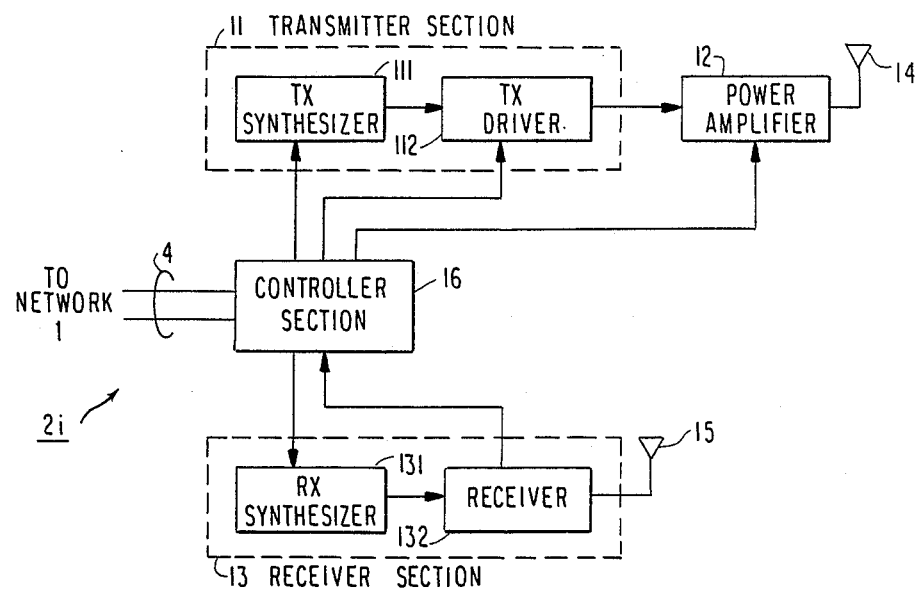
FIG. 2 is a block diagram of a fixed unit which is included in the system of FIG. 1.

FIG. 2 shows a specific construction of the fixed unit 2i (i being 1 to n) of FIG. 1. As shown, the fixed unit 2i includes a transmitter section 11 which in turn includes a transmit (TX) synthesizer 111 and a TX driver 112. Receiving a channel switch signal from a controller section 16, the TX synthesizer 111 generates a signal having a predetermined frequency and feeds it to the TX driver 112. The TX driver 112 prepares a carrier wave by using the signal from the TX synthesizer 111 for a local oscillation signal, then modulates the carrier wave with a control signal from the controller section 16 and with an audio signal which comes in over any of the subscriber lines 4 via the controller section 16, and then delivers the resulting signal to a power amplifier section 12. The power amplifier section 12 power-amplifies the modulated carrier wave and, then, sends it to the portable units through a transmit antenna 14. A power source for the power amplifier section 12 is turned ON and OFF by the controller section 16 and, in a stand-by condition, maintained OFF. In a stand-by condition, a power source for the transmitter section 11 is held in an ON state while, at the same time, the transmitter 11 is tuned to the stand-by channel by controlling the oscillation frequency of the TX synthesizer 111. The stand-by channel (X-CH) does not lie in the frequency band to which the control and speech channels belong, whereby any leakage of electromagnetic wave to the power amplifier 12 is prevented from interfering with the control and speech channels.

A receiver section 13 includes a receiver (RX) synthesizer 131 and a receiver 132. The RX synthesizer 131 generates a local oscillation signal corresponding to a channel switch signal which is fed thereto from the controller section 16, applying the signal to the receiver 132. In response, the receiver 132 is tuned to a predetermined channel to receive and demodulate a signal of that predetermined channel, which comes in through a receive antenna 15, the demodulated signal being fed to the controller section 16. By controlling the oscillation frequency of the RX synthesizer 131, the receiver section 13 is continuously tuned to the control channel (C-CH) while the stand-by condition is maintained.

The controller section 16 effects the transmission and reception of an audio signal between the subscriber lines 4 and the transmitter section 11 and receiver section 13, the designation of a transmit and a receive channel, the transmission and reception of a control signal, etc. The controller section 16 will be described in detail with reference to FIG. 3.

Figure 3:
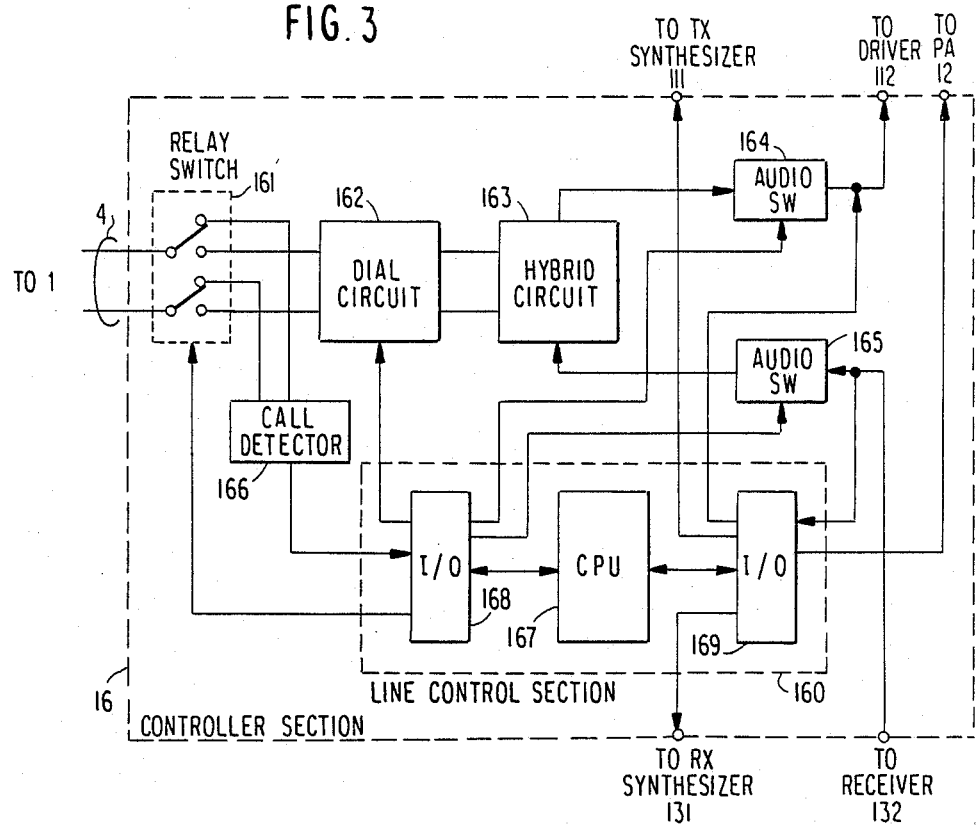
FIG. 3 is a block diagram of a controller section built in the fixed unit as shown in FIG. 2.

In FIG. 3, a line relay 161 is controlled such that in a stand-by condition it connects the subscriber line 4 to a call detector 166, as shown in the figure, and, during origination of a call on any portable unit and during conversation, connects the subscriber line 4 to a dial circuit 162. When detected a calling signal which is transmitted over the subscriber line 4, the call detector 166 delivers a detect signal to a central processing unit (CPU) 167 via a first input/output (I/O) port 168. Controlled by the CPU 167, the dial circuit 162 feeds to the subscriber line 4 a select signal which is constituted by a push-button (PB) signal or a dial pulse signal. A hybrid circuit 163 is connected to the dial circuit 162 which is of a two-wire to four-wire conversion type. The hybrid circuit 163 is connected to the transmitter section 11 and the receiver section 13 via audio switches 164 and 165, respectively. The audio switches 164 and 165 are controlled by the CPU 167 to close while a conversation is held.

The oscillation frequencies of the TX and RX synthesizers 111 and 131 are controlled by the CPU 167 via a second I/O port 169. The control of the CPU 167 over the switches 164 and 165 is effected through the I/O port 169 also. Further, the power ON-OFF control by the CPU 167 over the power amplifier 12 is effected through the I/O port 169. The interchange of various kinds of control signals between the fixed unit and the portable unit is performed between the CPU 167 of the fixed unit and that of the portable unit, which will be described, via the I/O port 169. The CPU 167 and the I/O ports 168 and 169 constitute a line control section 160 which is commonly installed in the fixed units 21 to 2n. Although not shown in the drawing, lines from the fixed units other than the fixed unit 2i are also connected to the I/O ports 168 and 169.

Figure 4:
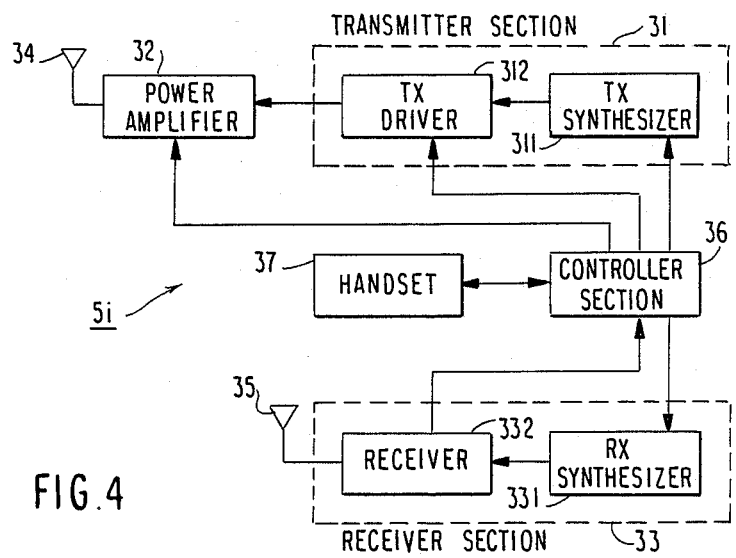
FIG. 4 is a block diagram showing a portable unit which is also included in the system of FIG. 1.

Referring to FIG. 4, the portable unit 5i is shown in a block diagram (i being 1 to m). The portable unit 5i includes a transmitter section 31 having a TX synthesizer 311 and an RX driver 312, a receiver section 33 having an RX synthesizer 331 and a receiver 332, a power amplifier section 32, a transmit antenna 34, and a receive antenna 35. These correspond to those of the fixed unit as shown in FIG. 2, i.e., they are operated and controlled in the same manner. A controller section 36 controls the interchange of audio signals between a handset 37 and the transmitter section 31 and receiver section 33 while, at the same time, monitoring a hook switch of the handset 37. When the portable unit 5i is in a stand-by condition, the transmitter section 31 is tuned to the stand-by channel (X-CH), and the receiver section 33 is tuned to the control channel (C-CH). This, as in the fixed unit 2i, prevents the interference with the control channel where the portable unit 5i is in a stand-by state.

Figure 5:
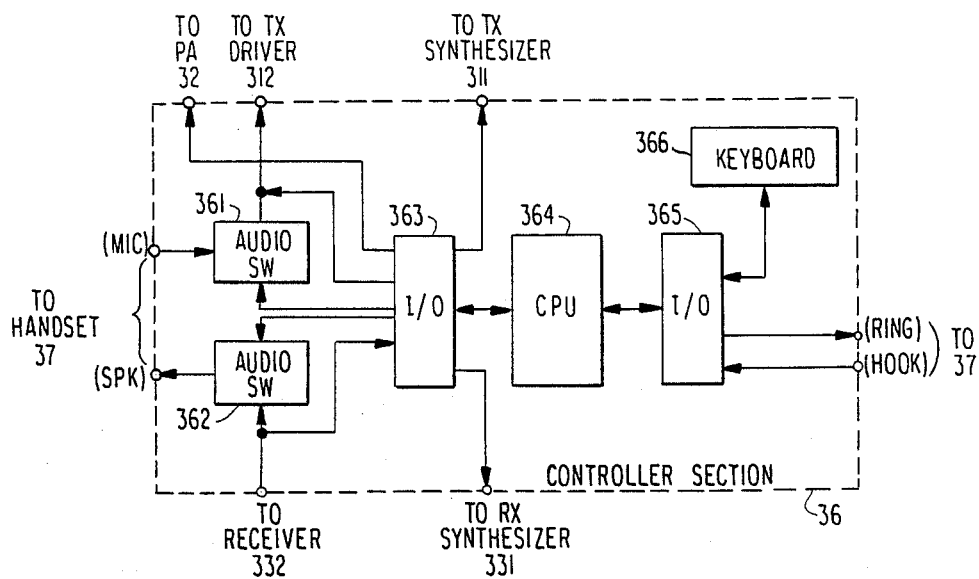
FIG. 5 is a block diagram of a controller section built in the portable unit as shown in FIG. 4.

FIG. 5 shows a specific construction of the controller section 36 of the portable unit 5i. A microphone and a speaker of the handset 37 are connected to, respectively, the TX driver 312 and the receiver 332 by way of audio switches 361 and 362, which are controlled by a CPU 364. The state of the hook switch of the handset 37 is monitored by the CPU 364 via an I/O port 365. The ringing bell of the handset is controlled through the I/O port 365 also. Also connected to the I/O port 365 is a keyboard 366, so that the interchange of signals between the CPU 364 and the keyboard 366 is effected through the I/O port 365. The CPU 364 controls the oscillation of the TX and RX synthesizers 311 and 331 and the ON-OFF of a power source for the power amplifier 32, by way of an I/O port 363. The interchange of various kinds of signals between the portable and fixed units are performed through the I/O port 363 also.

Figure 6:
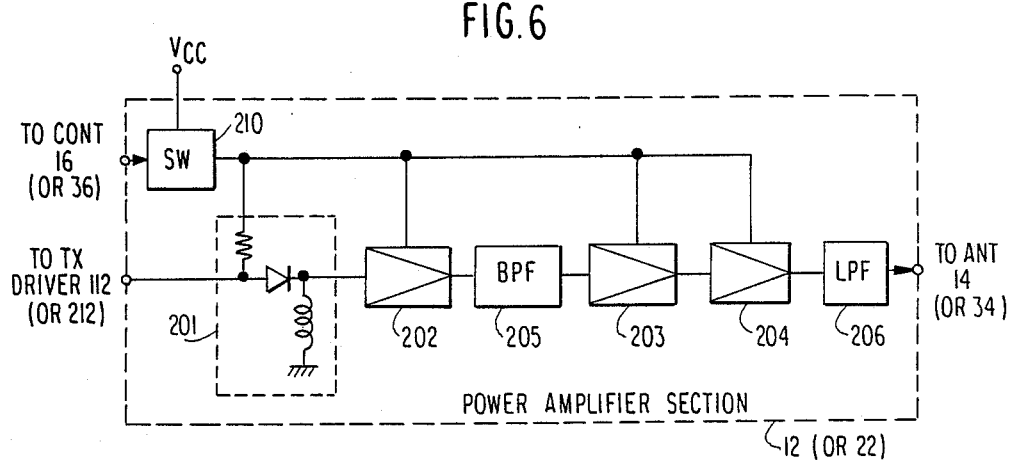
FIG. 6 is a block diagram of a power amplifier section included in each of the fixed and portable units of FIGS. 2 and 4.

Referring to FIG. 6, a specific construction of the power amplifier section which is installed in each of the fixed and portable units is shown. As shown, the power amplifier section 12 (or 22) includes power amplifiers 202, 203 and 204 which are arranged in three consecutive stages. A power source Vcc is connected to the power amplifiers 202 to 204 via a switch 210. Under the control of the controller section 16 (or 36), the switch 210 is held open while its associated unit is in a stand-by condition. A band-pass filter (BPF) 205 is connected to the output of the power amplifier 205 so as to suppress out-of-band noise. Further, a low-pass filter (LPF) 206 is connected to the output of the power amplifier 204 for the purpose of removing higher harmonics, the output of the LPF 206 being connected to the transmit antenna 14 (or 34). A switch circuit 201 is connected between the TX driver 112 (or 212) and the power amplifier 202, so that an electromagnetic wave may be prevented from leaking while the switch 210 is open.

The operation of the mobile communications system in accordance with the present invention will be described with reference to FIGS. 7A and 7B. For the simplicity of description, the description to follow is limited to the connection of an incoming call to a single portable unit.

Figure 7A:
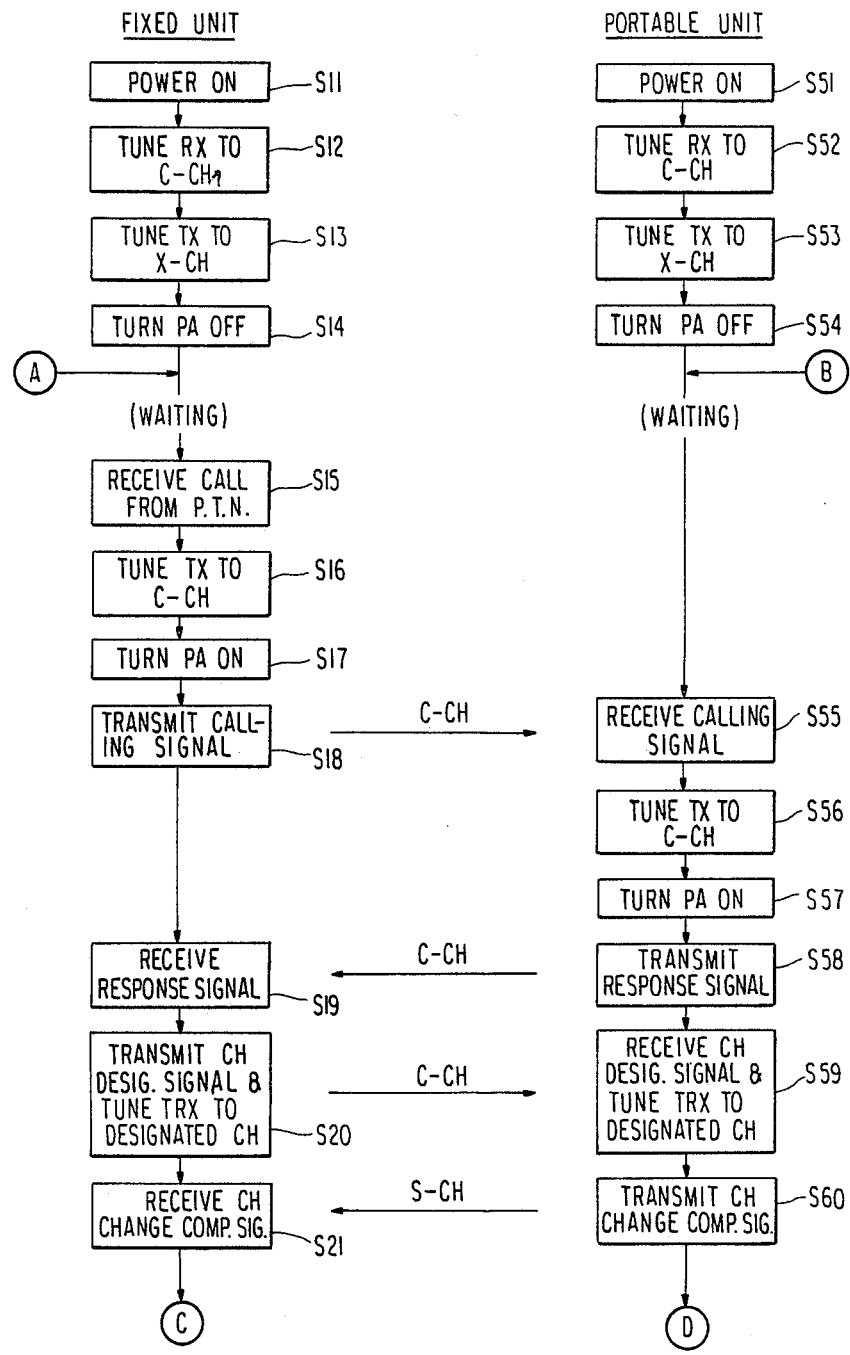
FIGS. 7A and 7B are flow charts representative of the operation of the mobile communications system as shown in FIGS. 1 to 6.

In FIG. 7A, the fixed unit powered at step S11 tunes the receiver section 13 to the control channel C-CH (S-12), tunes the transmitter section 11 to the stand-by channel X-CH (S-13), and turns OFF the power source for the power amplifier section 12 (S-14), thereby setting up a stand-by condition. Likewise, the portable unit powered at step S51 completes the initialization by consecutive steps S52, S53 and S54, setting up a stand-by condition.

When the fixed unit receives a call over the public telephone network at step S15, it tunes the transmitter section 11 to the control channel C-CH at step S16 and turns ON the power source for the power amplifier section 12 at step S17. Then, at step S18, the fixed unit sends a calling signal to the portable unit. Receiving this calling signal at step S55, the portable unit tunes the transmitter section 31 to the control channel C-CH at step S56 and turns ON the power source for the power amplifier 32 at step S57. Then, the portable unit sends a response signal to the fixed unit over the control channel C-CH, as represented by step S58.

Upon reception of the response signal at step S19, the fixed unit transmits a channel designate signal representative of a speech channel S-CH to be used for conversation to the portable unit over the control channel C-CH while, at the same time, tuning the transmitter section 11 and receiver section 13 to the speech channel S-CH designated, as represented by step S20. Receiving the channel designate signal at step S59, the portable unit tunes its transmitter section 31 and receiver section 33 to the speech channel S-CH as represented by the channel designate signal. Upon completion of the changeover to the designated speech channel S-CH, the portable unit sends a channel change complete signal to the fixed unit over the speech channel S-CH at step S60. Receiving the channel change complete signal at step S21, the fixed unit advances to step S22 (FIG. 7B) for sending a ringing signal to the portable unit over the speech channel S-CH. As the portable unit receives the ringing signal at step S61, it rings a bell to alert the subscriber of the portable unit to the incoming call.

When the subscriber of the portable unit picks up the handset, the portable unit detects an off-hook state at step S63 and, in the subsequent step S64, sends an off-hook signal to the fixed unit over the speech channel S-CH. Thereafter, at step S65, the portable unit connects the transmitter section 31 to the handset 37 to allow a conversation to be held. On the other hand, when the fixed unit receives the off-hook signal at step S23, it connects its transmitter section 11 and receiver section 13 to the subscriber line by the line relay at step S24. By the procedure stated so far, the calling subscriber and the subscriber of the portable unit are allowed to start a conversation.

When the subscriber of the portable unit hangs up the handset 37 to finish the conversation, the portable unit detects an on-hook sate at step S66 and, then, advances to step S67 to transmit an on-hook signal to the fixed unit over the speech channel S-CH which has been used. Thereafter, at step S68, the portable unit disconnects its transmitter section 31 and receiver section 33 from the handset 37 and, at steps S69 to S71, turns OFF the power amplifier section 32, tunes the transmitter section 31 to the stand-by channel X-CH, tunes the receiver section 33 to the control channel C-CH, and returns to the stand-by state. On the other hand, receiving the on-hook signal at step S25, the fixed unit disconnects the transmitter section 11 and receiver section 13 from the subscriber line at step S26 and, then, transfers to step S27. At step S27, the fixed unit turns OFF the power amplifier section 12 and, in the subsequent steps S28 and S29, tunes the transmitter section 11 to the stand-by channel X-CH and the receiver section 13 to the control channel C-CH to thereby regain the stand-by state.

Figure 7B:
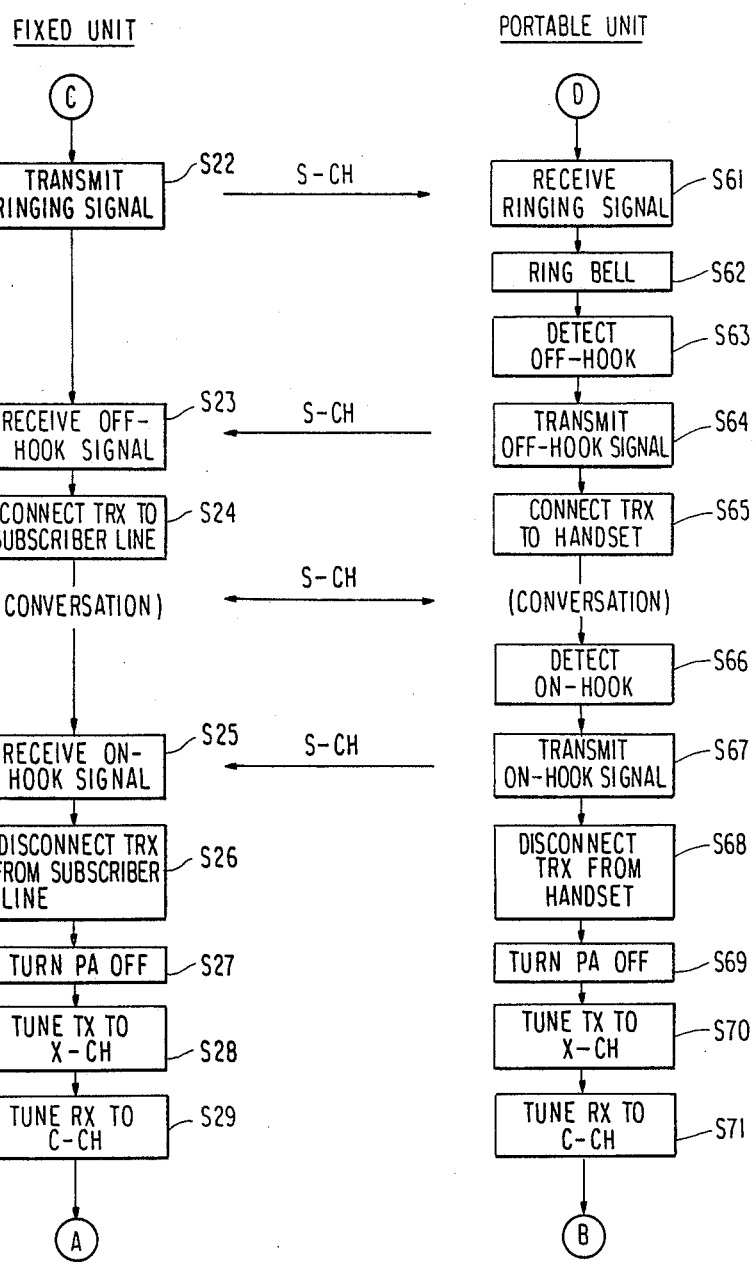

While the description made with reference to FIGS. 7A and 7B has concentrated on the connection of an incoming to the portable unit, the concept of the present invention applies to the origination of a call on the portable unit as well. Specifically, all that is required is, in a stand-by condition, tuning the transmitter sections 11 and 31 of the fixed and portable units to the stand-by channel X-CH and, upon origination or reception of a call, tuning them to the control channel C-CH and, upon completion of a conversation, tuning them to the stand-by channel X-CH. Such prevents an interfering electromagnetic wave from being radiated from the transmitter section of the fixed or portable unit which is in a stand-by condition to the control channel C-CH.

In summary, it will be seen that the present invention provides a mobile communications system in which a transmitter section of a unit which is in a stand-by state is tuned to a stand-by channel whose frequency does not lie in the frequency band of radio channels used, allowing other channels to use a control channel as desired. Since a power amplifier does not need any extra circuit for eliminating the leakage of electromagnetic wave, the entire circuit is simple and inexpensive.

What is claimed is:

1. A mobile communications system comprising:

a fixed unit connected to a public telephone network by a subscriber line; and a portable unit connectable to said fixed unit by radio channels which comprise at least one control channel and a plurality of speech channels;

said fixed unit comprising:

a first transmitter section and a first receiver section which are connected to said subscriber line;

first transmit tuning means for selectively tuning said first transmitter section to one of said radio channels and a first stand-by channel the frequency of which is not used for communications in said system;

first receive tuning means for selectively tuning said first receiver section to one of said radio channels; and a first controller section for controlling said first transmit and receive tuning means such that when said fixed unit is in a stand-by condition, said first transmitter and receiver sections are tuning to, respectively, said first stand-by channel and said control channel;

said portable unit comprising:

a second transmitter section and a second receiver section which are coupled to a handset;

second transmit tuning means for selectively tuning said second transmitter section to one of said radio channels and a second stand-by channel the frequency of which is not used for communications in said system;

second receive tuning means for selectively tuning said second receiver section to one of said radio channel; and a second controller section for controlling said second transmit and receive tuning means such that when said portable unit is in a stand-by condition, said second transmitter section and receiver section are tuned to said second stand-by channel and said control channel, respectively.

2. A mobile communications system as claimed in claim 1, wherein said fixed unit further comprises a first power amplifier section for power-amplifying the output of said first transmitter section, said portable unit further comprising a second power amplifier section for poweramplifying the output of said second transmitter section.

3. A mobile communications system as claimed in claim 1, wherein said first and second stand-by channels have a same frequency.

4. A mobile communications system as claimed in claim 3, wherein the frequency of said first and second stand-by channels is situated outside of the frequency band of said radio channels.

5. A mobile communications system as claimed in claim 2, wherein said first and second transmit and receive tuning means comprise first and second transmit and receive synthesizers, respectively.

6. A mobile communication system as claimed in claim 5, wherein when said fixed and portable units are in a stand-by condition each, said first controller section turns ON power sources for said first transmitter and receiver sections and first transmit and receive synthesizers and turns OFF a power source for said first power amplifier section while, at the same time, said second controller section turns ON power sources for said second transmitter and receiver sections and second transmit and receive synthesizers and turns OFF a power source to said second power amplifier section.

7. A mobile communications system as claimed in claim 1, wherein when said fixed and portable units are in a stand-by condition, each said first and second controller sections control, respectively, said first and second receive tuning means such that said first and second receiver sections are tuned to the control channel.

8. A mobile communications system as claimed in claim 7, wherein in response to an end of said stand-by condition of each of said fixed and portable units said first and second controller sections control, respectively, said first and second transmit tuning means such that said first and second transmitter sections are tuned to said control channel in place of the first and second stand-by channels.

9. A fixed unit for a mobile communications system, comprising:

a transmitter and a receiver section connected to a public telephone line by a subscriber line;

first tuning means for selectively tuning said transmitter section to one of a plurality of radio channels for communication and a stand-by channel the frequency of which is not used for communications in said system;

second tuning means for selectively tuning said receiver section to one of said radio channels for communication; and a controller section for, when said fixed unit is in a stand-by condition, controlling said first tuning means such that said transmitter section is tuned to said stand-by channel.

10. A fixed unit as claimed in claim 9, wherein the frequency of said stand-by channel is situated outside of the frequency band of said radio channels.

11. A fixed unit as claimed in claim 9, further comprising a power amplifier section for power-amplifying the output of said transmitter section.

12. A fixed unit as claimed in claim 9, wherein each of said first and second tuning means comprises a synthesizer.

13. A fixed unit as claimed in claim 10, wherein when said fixed unit is in a stand-by condition, said controller section turns ON power sources for said transmitter and receiver sections and said synthesizers while turning OFF a power source for said power amplifier section.

14. A fixed unit as claimed in claim 9, wherein said radio channels for communication comprises a single control channel and a plurality of speech channels, said controller section when said fixed unit is in a stand-by condition controlling said second tuning means such that said transmitter section is tuned to said control channel.

15. A fixed unit as claimed in claim 14, wherein in response to an end of the stand-by condition of said fixed unit said controller section controls said first tuning means such that said transmitter section is tuned to said control channel in place of said stand-by channel.

16. A portable unit for a mobile communications system, comprising:

a transmitter and a receiver section which are connected to a handset;

first tuning means for selectively tuning said transmitter section to one of a plurality of radio channels for communication and a stand-by channel the frequency of which is not used for communications in said system;

second tuning means for selectively tuning said receiver section to one of said radio channels for communication; and a controller section for, when said portable unit is in a stand-by condition, controlling said first tuning means such that said transmitter section is tuned to said stand-by channel.

17. A portable unit as claimed in claim 16, wherein the frequency of said stand-by channel is situated outside of the frequency band of said radio channel.

18. A portable unit as claimed in claim 16, further comprising a power amplifier section for power-amplifying the output of said transmitter section.

19. A portable unit as claimed in claim 16, wherein each of said first and second tuning means comprises a synthesizer.

20. A portable unit as claimed in claim 19, wherein when said portable unit is in a stand-by condition, said controller section turns ON power sources for said transmitter and receiver sections and synthesizers and turns OFF a power source for said power amplifier section.

21. A portable unit as claimed in claim 16, wherein said radio channels for communication comprises one control channel and a plurality of speech channels, and said controller section when said portable unit is in a stand-by condition controls said second tuning means such that said receiver section is tuned to said control channel.

22. A portable unit as claimed in claim 21, wherein in response to an end of the stand-by condition of said portable unit said controller section controls said first tuning means such that said transmitter section is tuned to said control channel in place of said stand-by channel.

23. A method of controlling channels of a first unit which is included in a mobile communications system, comprising the steps of:
when said first unit is in a stand-by condition, tuning a transmitter section of said first unit to a stand-by channel which is not used for communications in said system, and tuning a receiver section of said first unit to a control channel which constitutes one of communication channels which are used for communications; and
in response to an end of the stand-by condition of said first unit, tuning said transmitter section to said control channel in place of said stand-by channel.

24. A method as claimed in claim 23, further comprising the steps of:
to allow said first unit and a second unit to hold a conversation over a speech channel selected out of said communication channels, tuning said transmitter and receiver sections of said first unit and a transmitter and a receiver section of said second unit to the selected channel by way of the control channel; and
in response to an end of the conversation, tuning said transmitter and receiver sections of said first unit to said stand-by and control channels, respectively.

25. A method as claimed in claim 24, wherein tuning of each of said transmitter and receiver sections of said first unit to the individual channel is implemented with a synthesizer.

26. A method as claimed in claim 25, further comprising the step of:
when said first unit is in a stand-by condition, turning ON power sources for said transmitter and receiver sections and synthesizer of said first unit and turning OFF a power source for said power amplifier section of said first unit.

27. A method as claimed in claim 24, wherein said transmitter and receiver sections of said first unit are connected to a public telephone line by a subscriber line.

28. A method as claimed in claim 24, wherein said transmitter and receiver sections of said first unit are connected to a handset.

29. In a mobile communications system having a fixed unit connected to a telephone line, and a plurality of portable units connectable to said fixed unit by radio channels, controlling connection of any of said portable units to said telephone line through said fixed unit by using a control channel which is included in said radio channels, and in a stand-by condition causing said fixed and portable units to remain in a stand-by condition without turning OFF power sources for transmitter sections of said fixed and portable units, at least one of said fixed unit and said portable units comprising:
frequency changing means for, in response to a start of the stand-by condition, changing a transmit frequency of said transmitter section to a stand-by channel the frequency of which is not used for communications in said system; and
frequency recovering means for, in response to an end of the stand-by condition, restoring said transmit frequency to the frequency of said control channel.

30. A system as claimed in claim 29, wherein the frequency of said stand-by channel is situated outside of the frequency of said radio channels.

* * * * *